No. 768,267. PATENTED AUG. 23, 1904.
T. A. CASSELS.
COMBINED FISH AND GAME TRAP.
APPLICATION FILED JUNE 1, 1904.
NO MODEL.
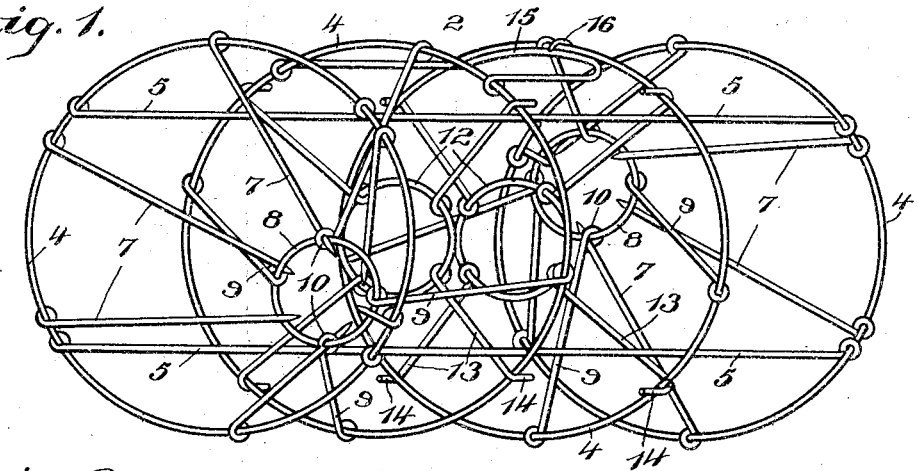
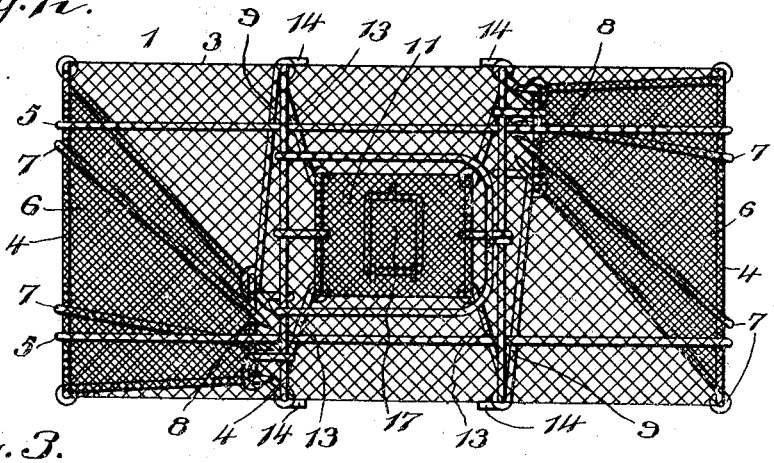
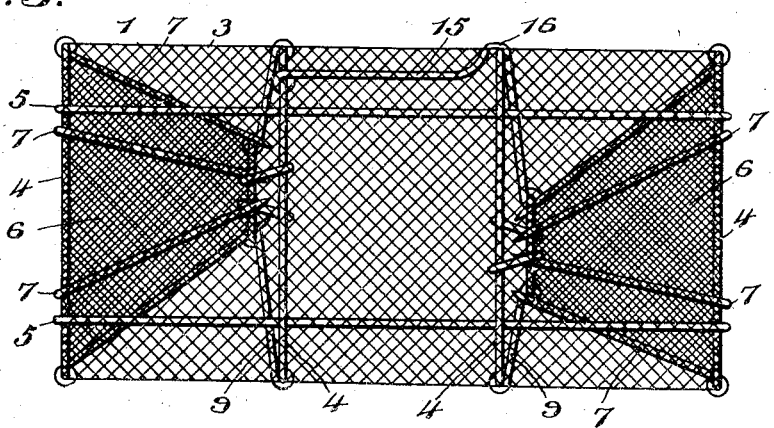
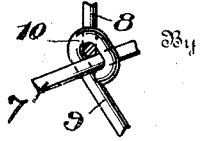

No. 768,267. Patented August 23, 1904.

UNITED STATES PATENT OFFICE.

THEODORE ALEXANDER CASSELS, OF ISLANDGROVE, FLORIDA.

COMBINED FISH AND GAME TRAP.

SPECIFICATION forming part of Letters Patent No. 768,267, dated August 23, 1904.

Application filed June 1, 1904. Serial No. 210,645. (No model.)

*To all whom it may concern:*

Be it known that I, THEODORE ALEXANDER CASSELS, a citizen of the United States, residing at Islandgrove, in the county of Alachua and State of Florida, have invented certain new and useful Improvements in a Combined Fish and Game Trap; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to a combined animal and fish trap, and has for its object to provide a device of this class which can be used in the capacity of an animal-trap and which can also be employed as a fish-trap.

With this object in view my invention consists in the novel construction of the frames of the trap and also in certain combinations of parts, which will be first fully described and afterward specifically pointed out in the appended claim.

Referring to the accompanying drawings, Figure 1 is a perspective view of the frame of the trap. Fig. 2 is a top plan view of the trap with wire covering or netting on the frame. Fig. 3 is a side elevation showing the inner basket removed, and Fig. 4 is a detail view of the manner of securing the impaling-point and the funnel-braces to the smaller ring of the funnel.

Like numerals of reference indicate the same parts throughout the several figures, in which—

1 indicates the trap, which is constructed of a suitable wire frame 2 and a suitable wire-netting 3, secured on said frame. Said frame is constructed of a series of rings 4, the two central rings being preferably of a springy resilient metal. Connecting the rings, as shown in Fig. 1, are longitudinal braces 5.

6 indicates the two funnels, the frame of which consists of a series of impaling-points 7, secured to the end ring 4 at one end and to the inner ring 8 of the funnel. It will be noted from Fig. 2 that the inner ring 8 of the funnels is located eccentrically. Supporting the funnel in this position and securely holding the same are a series of braces 9, secured to one of the central rings 4 and secured at their inner ends to the small ring 8. It will be noted from Figs. 1 and 4 that the braces 9 also hold the impaling-points 8 in proper position, making them rigid and eliminating all movement thereof. The inner ends of the braces 9 are provided with a loop 10, through which the inner ends of the impaling-points 7 pass, said loop also encircling the small ring 8.

11 indicates the bait-basket, which is suspended centrally within the trap and is composed of two end rings 12, to which is secured a small wire-netting.

13 indicates a series of braces or suspending-links which are secured at one end to the rings 12, the outer ends being provided with a hook 14, which is adapted to engage the springy resilient hoops or rings 4.

15 indicates a door, which is hinged to one of the hoops 4 and secured by means of a catch-hook 16 to the adjoining ring 4. A suitable door 17 is provided on said bait box or basket 11 for the purpose of placing bait within the basket.

Having thus fully described the several parts of my invention, its operation is as follows: The device, as shown in Fig. 2, with the basket suspended within the trap is designed to be used as an animal-trap for all classes of small game or rodents. The trap, as shown in Fig. 3, shows the bait-basket removed, and the device is designed to be used in this way for trapping fish. Impaling-points 7 are, as is well understood, for the purpose of preventing an animal from escaping from the trap after once passing through the funnel end.

In order to make this device applicable for both fish and game, it is provided for the ready removal of the central bait-basket 11. As before described and clearly shown, said bait-basket is suspended by means of the suspending-links 13, which are provided with hooked ends for the purpose of engaging the springy resilient hoops 4. In order to attach the bait-basket, the same is inserted through the door 15 and the suspending-links 13 are hooked over the resilient hoops 4, which effectually holds the bait-basket in the desired position. Bait is inserted within the basket, and the trap is placed in a convenient place for game.

In utilizing the device as a fish-trap the bait-basket is removed by simply disengaging the hooks 14 from the resilient hoops 4, and the basket is removed through the door 15.

Having thus fully described my invention, the simplicity of the construction employed will be at once apparent, and it is in this connection that my invention particularly consists. However, I do not wish to be understood as limiting myself to the exact particulars, as various slight changes might be made therein which would fall within the limit and scope of my invention, and I consider myself clearly entitled to all such changes and modifications.

What I claim as my invention, and desire to secure by Letters Patent of the United States, is—

In a trap for the purposes described, the combination of a suitable frame comprising two end hoops and two central resilient hoops all substantially the same diameter, funnel-shaped entrances secured to said end hoops and a series of braces leading from said resilient hoops to the inner end of said funnel-entrances to securely hold the said funneled entrances in position, a bait-basket within said trap and a series of suspending-links secured to said basket and provided with hooks on their outer ends adapted to engage said resilient hoops, substantially as described, and for the purposes set forth.

In testimony whereof I affix my signature in presence of two witnesses.

his
THEODORE ALEXANDER X CASSELS.
mark.

Witnesses:
Wm. S. Davenport,
W. W. Montgomery.